United States Patent [19]

Hattori

[11] 4,302,707

[45] Nov. 24, 1981

[54] ELECTRIC FLASH DISCHARGE DEVICE

[75] Inventor: Shinichiro Hattori, Tokyo, Japan

[73] Assignee: Olympus Optical Co., Ltd., Tokyo, Japan

[21] Appl. No.: 124,976

[22] Filed: Feb. 27, 1980

[30] Foreign Application Priority Data

Mar. 7, 1979 [JP] Japan ............................ 54-26579

[51] Int. Cl.³ ............................................. H05B 41/32
[52] U.S. Cl. ............................. 315/241 P; 315/151; 315/208
[58] Field of Search .................. 315/151, 208, 241 P, 315/311; 354/33, 145

[56] References Cited

U.S. PATENT DOCUMENTS 3,846,811  11/1974  Nakamura et al. ............... 354/145
3,946,269  3/1976  Ban ................................. 315/241 P X

FOREIGN PATENT DOCUMENTS 49-3622  1/1974  Japan .

*Primary Examiner*—Eugene R. La Roche
*Attorney, Agent, or Firm*—Frishauf, Holtz, Goodman & Woodward

[57] ABSTRACT

An electric flash discharge device comprises a capacitor charged by a power source, a trigger device including an operating member for producing a trigger signal in response to the actuation of the operating member, and a discharge tube connected to the capacitor and trigger device so as to be triggered in response to the trigger signal to form a discharge circuit for the capacitor. A control signal generator is provided for providing a control signal in response to generation of the trigger signal, and a current control means is connected between the capacitor and the discharge tube for controlling, in response to the control signal, the discharge current flowing through the discharge tube so that the discharge current gradually increases from a low value to a peak value after initiation of the discharge as a function of the control signal.

6 Claims, 17 Drawing Figures

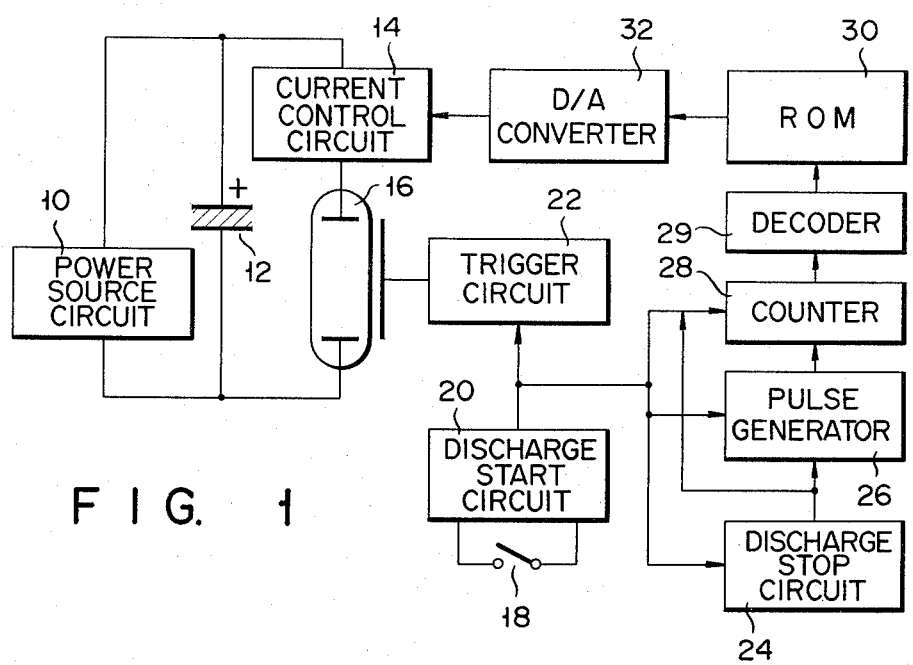
F I G. 1

ELECTRIC FLASH DISCHARGE DEVICE

BACKGROUND OF THE INVENTION

This invention relates to an electric flash discharge device for use in, for example, a camera.

Conventionally, as a light source for a camera is used a flash discharge tube which is caused to emit light by the discharge current of the capacitor connected thereto. Since the amount of light emitted from the discharge tube can be controlled by controlling the discharge current of the capacitor, an automatic light-emission control, which is made in such a manner as the tube receives light reflected from a foreground subject to be photographed and automatically stops emitting light in accordance with the amount of the light thus received, can be employed with the discharge tube. Generally, however, the service life of the discharge tube is shortened as the discharge current rapidly increases. In a conventional flash discharge device, therefore, an inductance element is connected in series with the device, thereby to make the rise in the discharge current slower so as to suppress the maximum value of the discharge current to not so large a value. However, where as in the case of an endoscope camera used to take a photograph of the interior of, for example, a human body, a large amount of light is required, the amount of the current as large as several hundreds of amperes occasionally flows, at the time of the peak, in the discharge tube. In order to make the series resistance of the inductance sufficiently small, therefore, the coil winding of the inductance element must be made of a very thick wire. This means that the flash discharge tube device becomes large in size and weight and therefore becomes inconvenient to use as a light source for the camera. Further, since an electric current flows in the coil, an electromagnetic flux is developed therein to have undesirable effects upon the other associated parts or to cause generation of sounds due to the electromagnetic force, thus to make a patient examined by the endoscope more uneasy than adequately expected or estimated. Further, since the inductance value is made unlikely to vary, there exists almost no room to freely vary the waveform of the discharge current. Not a few inconveniences, therefore, occur in respect of control of the amount of light from the discharge tube and maintenance of it.

There has also been proposed a flash discharge tube, as described in Japanese patent application disclosure No. 3622/74, in which a constant current circuit is connected to a discharge circuit of the tube to control the discharge tube to keep it at a specified value. In such type of discharge tube, however, it is indeed possible to control the amount of light from the tube. But, since upon commencement of the discharge the amount of the discharge current rapidly increases to the above-mentioned value, the problem that the service life of the tube shortens cannot be solved.

SUMMARY OF THE INVENTION

The object of the present invention is to provide an electric flash discharge device which is simple in construction and in which the amount of light emitted from the discharge tube can be controlled without shortening the service life thereof.

The above object has been achieved by an electric flash discharge device which comprises a capacitor which is charged by a power source, a trigger means for producing a trigger signal in accordance with the actuation of an actuating member, a discharge tube which is connected to the capacitor and which, in response to the trigger signal supplied to its trigger terminal, is triggered to form a discharge circuit of the capacitor to emit light due to a discharge current of the capacitor, and a current control means for controlling the discharge current which flows in the discharge tube so that the discharge current gradually increases from a low value to a peak value.

BRIEF DESCRIPTION OF THE DRAWINGS

FIG. 1 is a block circuit diagram illustrating an electric flash discharge device according to an embodiment of the invention;

DESCRIPTION OF THE PREFERRED EMBODIMENTS

Figure 2A:
FIGS. 2A to 2E are timing charts for explaining the operation of the electric flash discharge device of FIG. 1.

In FIG. 1, a capacitor 12 is connected to a power source circuit 10. A flash discharge tube 16 is connected, via an electric current control circuit 14, to the capacitor 12. The power source circuit 10 is comprised of, for example, a DC-DC converter or AC-AC converter. The current control circuit 14 is comprised of, for example, a transistor or an FET connected in series with the flash discharge tube 16. The circuit 14 serves to control the current flowing in the tube 16 in response to a control signal applied to the circuit 14.

A trigger switch 18, which operates in accordance with, for example, a release button, is connected to a discharge start circuit 20. This circuit 20 produces a start pulse when the trigger switch 18 is closed. The output of the discharge start circuit 20 is supplied to a trigger circuit 22. The circuit 22 has an output terminal which is connected to a trigger terminal of the flash discharge tube 16. The circuit 22 operates to raise its input signal to a high level and thus produces a trigger signal having such high level. The start pulse from the discharge start circuit 20 is also supplied to each of a discharge stop circuit 24, pulse generator 26 and counter 28. The discharge stop circuit 24 has a light receiving means and receives the light which, after it is emitted from the discharge tube 16, is reflected from a foreground subject to be photographed and, when the received amount of light has reached a specified value, produces an end pulse. The discharge stop circuit 24 may be of a type which has a timer means and produces an end pulse in a specified period of time after the start of the discharging operation. The output of the pulse generator 26 is supplied to the counter 28, the output of which is supplied, via a decoder 29, to an address input terminal of a Read Only Memory (hereinafter referred to simply as ROM) 30. The data output of ROM 30 is supplied, via a D/A converter 32, to a control terminal of the current control circuit 14.

Figure 2B:
Figure 2C:
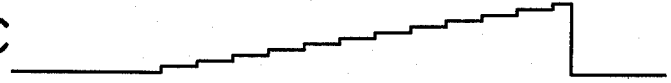
Figure 2D:
Figure 2E:
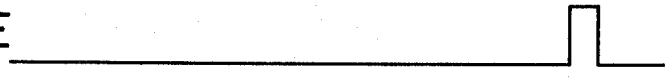

There will now be described the operation of the electric flash discharge device having the above-mentioned construction by reference to the timing charts illustrated in FIGS. 2A to 2F. Usually, the capacitor 12 is kept charged by the power source circuit 10, so that a sufficiently high voltage is kept applied to the flash discharge tube 16. Upon closure of the trigger switch 18, the discharge start circuit 20 produces a start pulse as shown in FIG. 2A which is supplied to the trigger circuit 22. As a result, the tube 16 is triggered by the trigger circuit 22 to permit a current to pass through it, whereby a flash occurs. Upon receipt of that start pulse, the count of the counter 28 is reset to zero and the pulse generator 26 supplies such a clock pulse as shown in FIG. 2B to the counter 28. The output of the counter 28 is decoded by the decoder 29, the output of which gradually rises stepwise in level as shown in FIG. 2C, in accordance with the clock pulse from pulse generator 26. The address of ROM 30 is designated by the decoder output and the data corresponding to that address is supplied to the current control circuit 14 via the D/A converter 32, as such a signal as shown in FIG. 2D. Thus, the discharge current of the discharge tube 16 is controlled. Therefore, if ROM 30 is previously stored, sequentially from the initial address number 0, with the data which makes slower the rise of the discharge current in its signal waveform and which yet suppresses the maximum rise thereof to a level which is not so high, the waveform of the discharge current signal can be controlled, by the current control circuit 14, to a predetermined waveform corresponding to the waveform of the input signal of the circuit 14, thus to prevent the shortening of the service life of the discharge tube 16. When the amount of light received by the discharge stop circuit 24 has reached a specified value, the discharge stop circuit 24 produces such an end pulse as shown in FIG. 2E which is supplied to the pulse generator 26 and also to the counter 28 to stop the generation of a clock pulse from the generator 26 and simultaneously to reset the counter 28. Note here that since the address number 0 of ROM 30 is stored with such a data as permits the current control circuit 14 to make the discharge current zero, the light emission from the discharge tube is stopped in accordance with the resetting of the counter 28.

In the above-mentioned manner, in this embodiment the electric discharge device can control the amount of light emitted therefrom with a simple and compact construction and without using the inductance element and without shortening the service life of the discharge tube. Further, it is noteworthy that if in this connection use is made of a microprocessor in which the discharge start circuit 20, discharge stop circuit 24, pulse generator 26, counter 28, decoder 29 and ROM 30 are incorporated on one chip, the device can be formed into a more compact size and be also reduced in terms of the price.

Reference will now be made to the electric flash discharge tube device according to other embodiments of the invention. The same parts and sections as those referred to in connection with the above-mentioned first embodiment of the invention are designated by the same reference numerals, respectively, and detailed description of such parts and sections are omitted.

Figure 3:
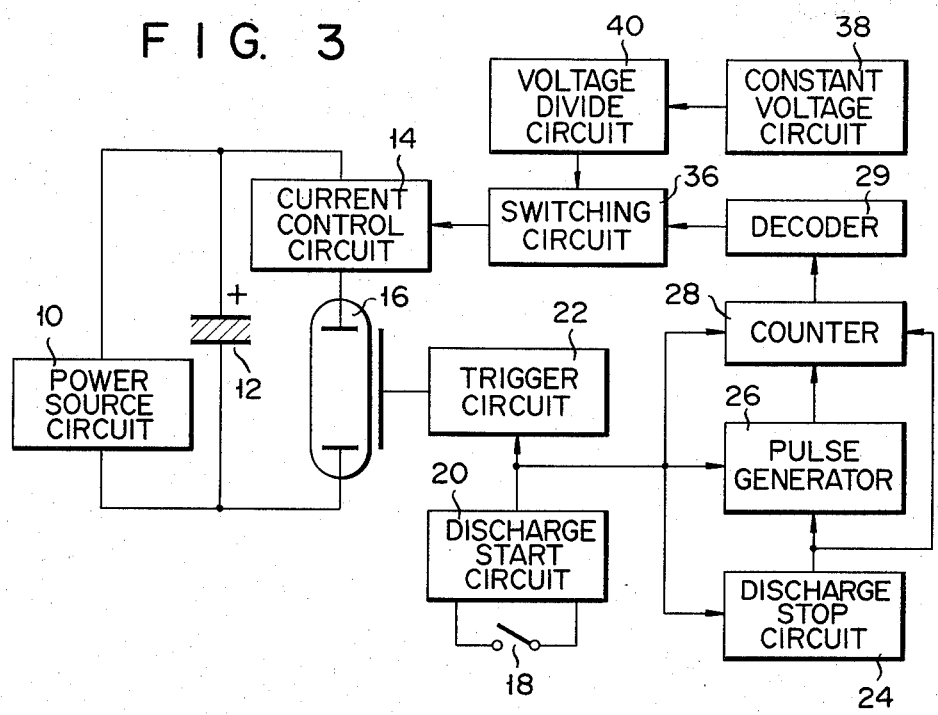
FIG. 3 is a block circuit diagram illustrating the electric flash discharge device according to another embodiment of the invention.
Figure 4:
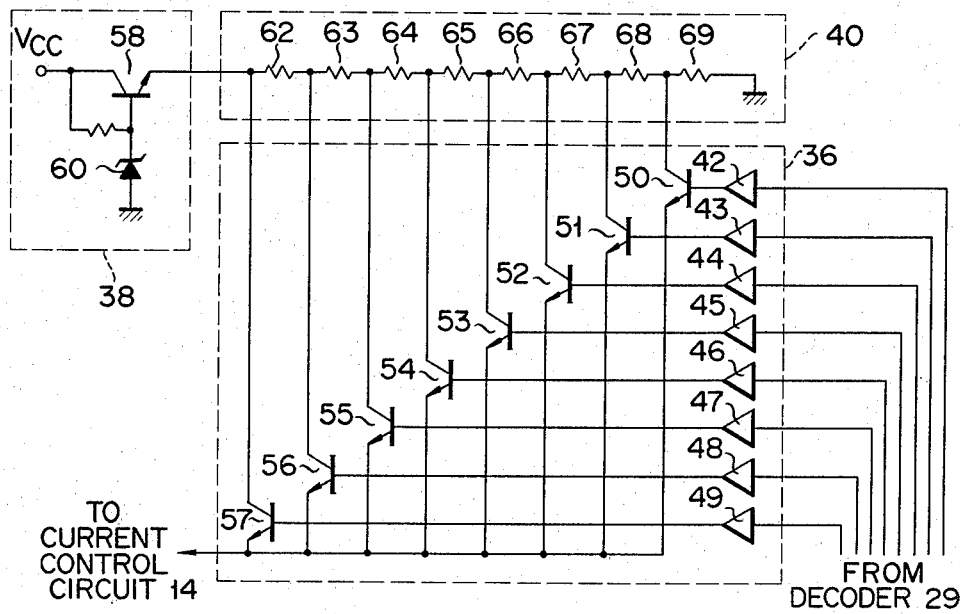
FIG. 4 is a detailed circuit diagram illustrating an electric current control means which is used for the device illustrated in FIG. 3.

FIG. 3 shows a block circuit diagram of the flash discharge device according to a second embodiment of the invention. This second embodiment differs from the above-mentioned first embodiment in that the output of the decoder 29 is supplied to the current control circuit 14 via the switching circuit 36 and that the constant voltage circuit 38 is connected to the switching circuit 36 via a voltage divide circuit 40. The switching circuit 36, constant voltage circuit 38 and voltage divide circuit 40 are illustrated in detail in FIG. 4. The output from the decoder 29 is supplied to the bases of the NPN type transistors 50 to 57 via drivers 42 to 49, respectively. The constant voltage circuit 38 has a transistor 58 of which the base is connected to the collector via a resistor, and a Zener diode 60 of which the cathode is connected to the base of the transistor 58. The emitter output of this transistor 58 becomes an output of the constant voltage circuit. The voltage divide circuit 40 is comprised of resistors 62 to 69 which are connected in series between the emitter of the transistor 58 and a ground potential. The points of connection (the points of voltage division) between the resistors 69 to 62 and the point of connection between the emitter of the transistor 58 and the leftmost resistor 62 are connected to collectors of the transistors 50 to 57 provided within the switching circuit 36, respectively, and the emitters of the transistors 50 to 57 are commonly connected to one connecting line which is connected to a control terminal of the current control circuit 14.

The operation of this embodiment is as follows. Upon closure of the trigger switch 18, the discharge current of the capacitor 12 flows in the discharge tube 16 to give rise to a flash. This is the same as in the case of the above-mentioned first embodiment. Then, the count output of the counter 28 which indicates a sequential increase in the value in response to the start pulse from the discharge start circuit 20 is supplied to the decoder 29. The decoder 29 operates to make conductive only a specified one of the transistors 50 to 57 in response to the count output of the counter 28. Thus, a voltage signal which has been obtained at a specified point of voltage division in the voltage divide circuit 40 is supplied to the current control circuit 14 via the switching circuit 36, thereby to cause the output of the switching circuit 36 to become such an output signal as shown in FIG. 2D, that is to say, an output signal which indicates a slower rise and the maximum value of which is not very large. Though in this embodiment the switching circuit is constituted by the transistors, analog switches can also be used as the switching elements.

Figure 5:
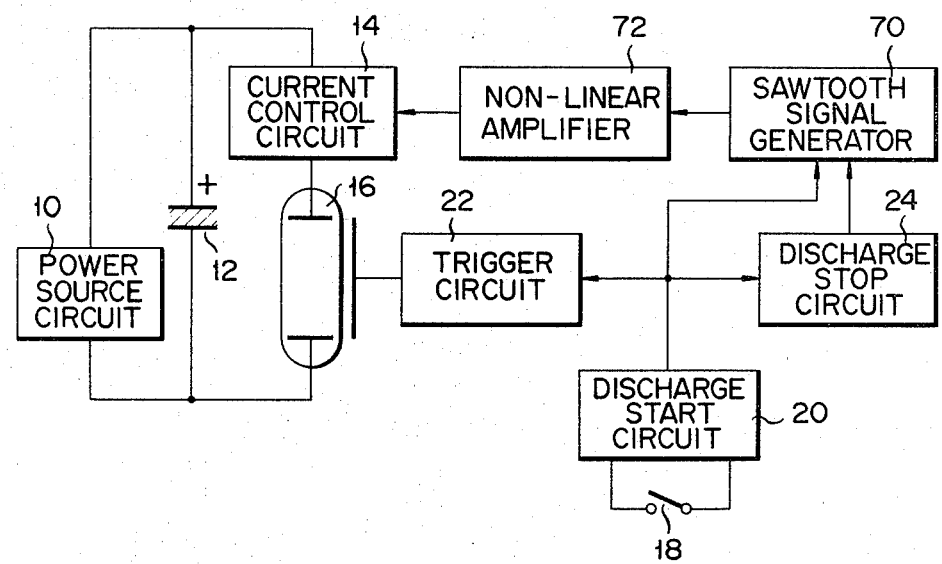
FIG. 5 is a block circuit diagram illustrating the electric flash discharge device according to still another embodiment of the invention.

In FIG. 5 is shown a block diagram of the electric circuit according to a third embodiment of the invention. The start pulse which is produced from the discharge start circuit 20 is supplied to the trigger circuit 22, to the discharge stop circuit 24 and to a sawtooth signal generator 70. The sawtooth signal which is generated from the sawtooth signal generator 70 is supplied, via a non-linear amplifier 72, to the control terminal of the current control circuit 14 which is connected in series to the discharge tube 16.

Figure 6A:
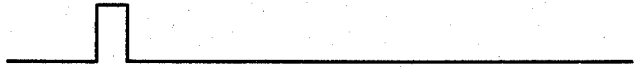
FIGS. 6A to 6D are timing charts for explaining the operation of the device of FIG. 5.
Figure 6B:
Figure 6C:
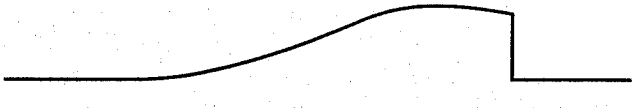
Figure 6D:

Upon closure of the trigger switch 18, such a start pulse as shown in FIG. 6A is generated from the discharge start circuit 20, whereby the discharge tube 16 is triggered to cause a discharge of the capacitor 12. Simultaneously, the sawtooth signal generator 70 is energized to produce such a sawtooth signal as shown in FIG. 6B. The non-linear amplifier 72 receives this sawtooth signal to amplify it in a non-linear manner as shown in FIG. 6C, thereby to control the current control circuit 14 in accordance with such amplified output. Thus, if we cause variation in the output waveform of the sawtooth signal generator 70 and in the input-output characteristics of the non-linear amplifier circuit 72, we can have perfect freedom to control the amount of light emitted from the discharge tube 16. Then, upon generation of such an end pulse as shown in FIG. 6D from the discharge stop circuit 24, the sawtooth signal generator 70 stops generating its sawtooth signal, whereby the discharge current becomes zero.

Figure 7:
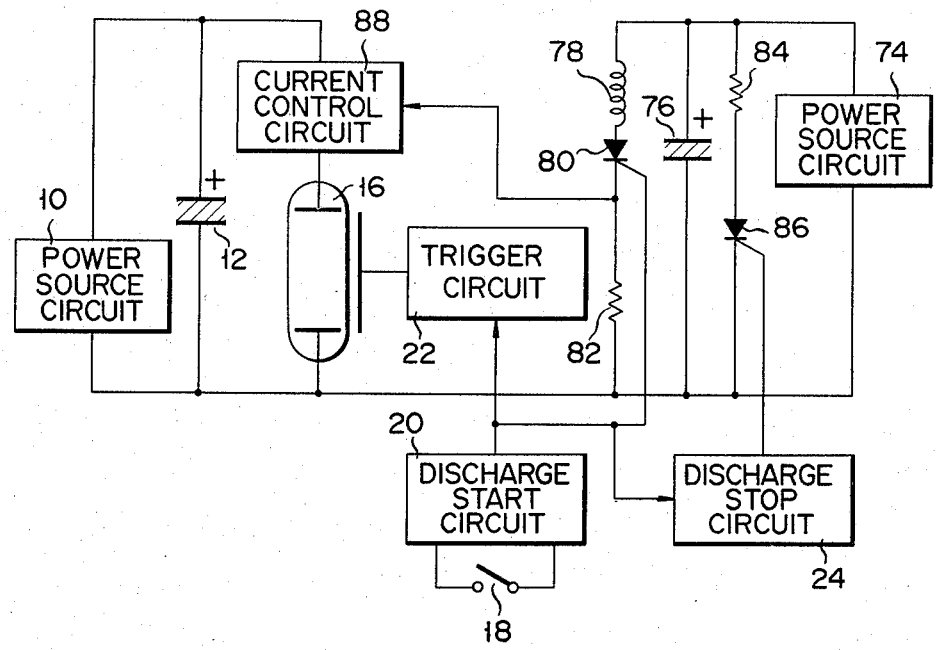
FIG. 7 is a block circuit diagram illustrating the electric flash discharge device according to a further embodiment of the invention.
Figure 8A:
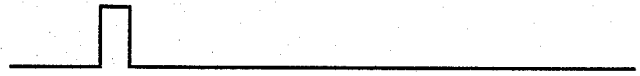
FIGS. 8A to 8C are timing charts for explaining the operation of the device of FIG. 7.
Figure 8B:

In FIG. 7 is shown a block diagram of the electric circuit according to a fourth embodiment of the invention. This fourth embodiment is the same as in the above-mentioned embodiments in that the output of the discharge start circuit 20 is supplied to the trigger circuit 22 and to the discharge stop circuit 24. In the fourth embodiment, however, an auxiliary power source circuit 74 is newly provided, to which is connected an auxiliary capacitor 76. The discharge circuit of the auxiliary capacitor 76 is two in number. To a first discharge circuit is connected a series circuit which consists of a coil 78, thyristor 80 and resistor 82. To a second discharge circuit is connected a series circuit which consists of a resistor 84 and a thyristor 86. The resistor 84 is arranged to have a resistance value which is smaller than that of the resistor 82. The output of the discharge start circuit 20 is connected to a gate of the thyristor 80, and a cathode of the thyristor 80 (the one end of the resistor 82) is connected to a control terminal of the current control circuit 88. The other end of the resistor 82 is maintained at the ground potential. The output of the discharge stop circuit 24 is connected to the gate of the thyristor 86. In this fourth embodiment, the discharge tube is triggered in response to such a start pulse as shown in FIG. 8A. Simultaneously, the thyristor 80 is rendered conductive, whereby the above-mentioned first discharge circuit of the auxiliary capacitor 76 being charged by the auxiliary power source circuit 74 is formed. Since the first discharge circuit comprised of the auxiliary capacitor 76, coil 78, thyristor 80 and resistor 82 differs from a usual discharge circuit for discharge tube only in that the resistor 82 is used in place of a discharge tube, the discharge current of such discharge circuit assumes such a waveform as shown in FIG. 8B. For this reason, the terminal voltage of the resistor 82 also indicates the same variation in waveform as that which appears in FIG. 8B, and, in response to that terminal voltage, the current control circuit 14 controls the discharge current.

Thus, since the discharge current of the auxiliary capacitor 76 can be controlled by varying the respective values of the capacitor 76, coil 78, thyristor 80 and resistor 82, we can have perfect freedom to control the waveform of a discharge current which flows in the discharge tube 16.

Figure 8C:
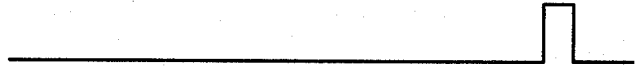

Since the discharge current of the auxiliary capacitor 76 is not for the purpose of causing an emission of light from the discharge tube 16, it may be small in the amount and the elements which constitute the discharge circuit may be also small in size. Upon generation of such an end pulse as shown in FIG. 8C from the discharge stop circuit 24, the thyristor 86 is rendered conductive. Since the resistor 84 is arranged to have a smaller resistance value than the resistor 82, the discharge current of the auxiliary capacitor 76 at that time flows, for the most part, through the resistor 84 and the thyristor 86. If at this time the resistance value of the resistor 84 is very small, the discharge current instantaneously flows and instantaneously becomes zero as shown in FIG. 8B. As a result, the light emission from the discharge tube 16 stops.

What is claimed is:

1. An electric flash discharge device comprising:
   a source of electric power;
   a capacitor coupled to said source of electric power so as to be charged by said power source;
   trigger means including an operating member for producing a trigger signal in response to the actuation of the actuating member;
   a discharge tube coupled to said capacitor and to said trigger means so as to be triggered in response to the trigger signal to form a discharge circuit for said capacitor;
   control signal generating means for generating a control signal responsive to generation of said trigger signal by said trigger means; and
   current control means coupled between said capacitor and said discharge tube and also to said control signal generating means, said current control means being responsive to said control signal for controlling the discharge current of said capacitor flowing through said discharge tube as a function of said control signal so that said discharge current gradually increases from a low value to a peak value after initiation of the discharge.

2. An electric flash discharge device according to claim 1, wherein said control signal generating means includes a clock pulse generator circuit for generating a clock pulse responsive to generation of said trigger signal by said trigger means, a counter circuit for counting output pulses from said clock pulse generator circuit and for producing an output signal which corresponds to its counted value, a storage circuit storing digital data at addresses in said storage circuit and which has its addresses designated corresponding to the counted value of said counter circuit, and a digital-to-analog converter circuit for converting digital data of said storage circuit to an analog signal and for supplying the converted digital data, as said control signal, to said current control means.

3. An electric flash discharge device according to claim 1, wherein said control signal generating means includes a clock pulse generator circuit for generating a clock pulse responsive to generation of said trigger signal by said trigger means, a counter circuit for counting output pulses from said clock pulse generator circuit and for producing an output signal which corresponds to its counted value, a voltage divider circuit coupled to said power source for dividing a voltage of said power source to produce a plurality of voltage signals, and a switching circuit coupled to said voltage divider circuit for selectively supplying a voltage signal from said voltage divider circuit, as said control signal, to said current control means as a function of the count value of said counter circuit.

4. An electric flash discharge device according to claim 1, wherein said control signal generating means includes a sawtooth signal generator circuit for generating a sawtooth signal responsive to generation of said trigger signal by said trigger means, and a non-linear amplifier circuit for amplifying the output of said sawtooth signal generator circuit in a non-linear manner for supplying such amplified output, as said control signal, to said current control means.

5. An electric flash discharge device according to claim 1, wherein said control signal generating means includes a second capacitor which is charged by the power source, and a circuit coupled to said second capacitor for causing discharging of said second capacitor responsive to generation of said trigger signal by said trigger means and for supplying an electric signal proportionate to the discharge current of said second capacitor, as said control signal, to said current control means.

6. An electric flash discharge device according to claim 1, wherein said current control means is inductorless.

* * * * *